Sept. 22, 1936. A. R. LINDBLAD 2,054,941
PROCESS IN SMELTING PYRITES
Filed June 12, 1934
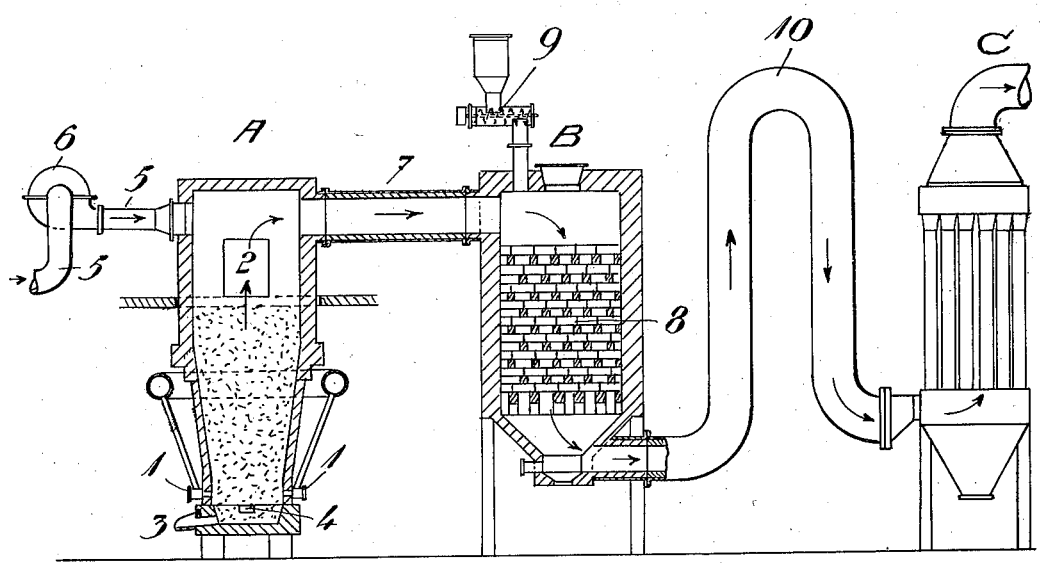
Inventor:
A. R. Lindblad,
By:
His Attorneys

UNITED STATES PATENT OFFICE 2,054,941

PROCESS IN SMELTING PYRITES

Axel Rudolf Lindblad, Djursholm, Sweden

Application June 12, 1934, Serial No. 730,364
In Sweden June 14, 1933

1 Claim. (Cl. 23—226)

It has been suggested to produce sulphur or possibly sulphide of arsenic in combination with the smelting of pyrites in such a way that the solid reduction agent together with the pyritic ore is introduced in such a quantity and in such a way, that it is sufficient for the reduction of the sulphur dioxide formed in the smelting of the pyrites in the lower part of the furnace and also for reaction with any possibly present free oxygen.

This process entails, however, a number of serious difficulties, which contribute to constitute an operation that is not very economical. One of these difficulties is that the furnace must be run comparatively slowly, so that the sulphur dioxide rising through the shaft will have time to be reduced by the carbon mixed with the ore, which as a rule occurs in the shape of coke in a rather coarse form. The other difficulty, which also to a certain degree is due to the slow operation, is that the matte obtained becomes poorer than is the case in ordinary smelting of pyrites, and this entails extra cost for concentration.

In the process which forms the object of the present invention these difficulties are altogether avoided and eliminated. Characteristic of the present invention is the fact that the gases containing sulphur dioxide passing off from the furnace are not brought in contact with the reduction agent in such quantity as is sufficient for the reduction of practically all the quantity of $SO_2$ and $As_2O_3$ in the gas as well as for the reaction with any possibly present $O_2$, until they have left the charge or respective charge column, but while they are still hot. The furnace gases admixed in this way with reduction agents are then conducted off, the air as a matter of course being shut off, either direct to the condenser plant intended for the recovery of the sulphur or sulphur dioxide, as the case may be, or first to the hereinafter mentioned reaction chamber and from the latter to the condenser plant.

As a suitable reduction agent for reducing the $SO_2$ or $As_2O_3$ content respectively of the furnace according to this invention may in the first instance be mentioned reducing gases, e. g. ordinary producer gas, gases from metallurgical processes, such as blast furnace gas, natural gas, vaporized hydrocarbons etc. Good results may also be attained with liquid reduction agents, e. g. petroleum. Even solid carbon in a finely divided form, so called carbon powder, is feasible and gives good results, even if the difficulties and trouble are somewhat greater than with the use of normally gaseous reduction agents.

Whether gaseous, liquid or finely divided reduction agents in a solid form be used, it is as a rule best to introduce the same in the upper part of the shaft furnace, at a suitable distance above the charge column. The reduction agent then gets a chance to become mixed with the gases formed in the smelting process immediately after these have left the charge, and are, therefore as hot as possible. The conversion between the furnace gas and the reduction agent takes place as a rule rather rapidly, to a great extent before the gaseous mixture has had time to leave the upper part of the furnace chamber. If it should be advisable for special cases the reduction agent may be admixed after the gas has left the shaft furnace. An endeavour should, however, always be made to see that the admixture takes place before the gases that are passing off have had time to be appreciably cooled off.

In the reduction process described here there occur often minor quantities of carbon disulphide, carbon oxysulphide, hydrogen sulphide etc. Even if the quantity of reduction agent introduced is adapted in such a manner that it is only sufficient for reaction or conversion with any $SO_2$ etc. present, there is always a tendency for minor quantities of these substances to be formed. In order to attain as complete and perfect a recovery of sulphur as possible with the least loss of reduction agent, it is therefore as a rule beneficial and advisable, as has already been pointed out in the preceding, to pass the still hot gases with their admixtures of reduction agents through a contact chamber filled with suitable material.

As contact agent may by way of example be used ordinary brick, but a much better effect is obtained if special material more catalytically active, is used. In particular iron and iron compounds, as well as alkali and alkali compounds have been found active in this respect. Ferruginous catalysts can be simply coated on bricks and the contact chamber filled with bricks stacked in a suitable way. The bricks are preferably coated with some ferruginous matter, e. g. ferruginous bauxite, f. i. so-called "Falu rödfärg", that is, English red, a well-known compound in the art, or some other ferruginous coating agent. Some kinds of bricks, especially certain sorts of magnesite bricks, contain from the very start such a large quantity of iron that no further coating is required. As alkaline catalyst may be especially mentioned soda or other sodium compounds as being both cheap and effective. In particular the combination iron-alkali has been found to possess a remarkably catalytic effect. Alkali can be introduced in the same way as described above with regard to iron, i. e. by coating the existing contact material, or also in the form of gas or dust, as the case may be. Vaporization can most easily and simply be brought about by introducing into the shaft furnace by way of example a small quantity of soda, which is there, at least partly, vaporized and accompanies the furnace gases in the form of dust, in the meantime acting highly beneficially upon the process.

The furnace gases treated with reduction agents are, after they have possibly passed the said reaction chamber, run into a condenser plant, where they are cooled to such a low temperature that sulphur and possibly sulphide of arsenic is condensed and recovered either in a liquid or solid form. In this process it is best to make use of a so-called Cottrell-apparatus, which is kept heated to such a temperature that the sulphur precipitated in the apparatus can be drawn off in a liquid form.

As sulphur easily gets fouled by soot and dust from the smelting and reduction process, it is advisable and beneficial at some suitable place in the system to set up a dust-removal device, e. g. another Cottrell-apparatus, through which the gas has to pass before it has had time to get cooled off to the condensation point of the sulphur.

As has already been stated in the introduction, the difficulties that have been connected with previous made attempts at recovering sulphur in connection with the smelting of pyrites, are avoided by the present invention. According to this invention the smelting process of the pyrites is really carried out in the old, customary way that has been in use for many decades, and the novelty does not commence until the gases developed in the smelting process have left the charge column. The reduction of the gas and the recovery of the sulphur need, therefore, not affect the course of the smelting of the pyrites, for this can be carried on as ordinarily, and the matte obtained will also be the same as in the ordinary way.

In order to make the invention more clear, there is shown diagrammatically on the accompanying drawing an apparatus for carrying out the process.

A is a shaft furnace of the usual water-jacket type and provided with tuyères 1 for introducing air under pressure. The material to be treated consists of pyrite crushed into suitable size mixed with silica and a small amount of carbonaceous material, usually coal, sufficient for reduction of only a minor part of the amount of $SO_2$ formed in the smelting process. Said material is introduced into the shaft furnace through openings 2 provided in the side walls of the furnace. The matte formed in the process is tapped off through outlets 3 and 4.

The $SO_2$-containing gas leaving the charge is mixed with a reducing gas (preferably producer gas) mixture in the upper part of the shaft furnace which reducing gas mixture has been introduced through the pipe 5 by means of the fan 6. Thereby a part of the $SO_2$ content immediately is reduced to free sulphur. However, in order to make the reduction more complete, the gas mixture thus obtained is led through the passage 7 into the contact chamber B containing suitable catalytic material. As shown by way of example this material may consist of common bricks piled as at 8, and preferably provided with a coating of some ferruginous material, for instance bauxite. In order to further increase the catalytic action, an alkali compound, for instance, carbonate of sodium, may be introduced into the said chamber B in the course of the process by means of the feeding device 9.

In order to remove soot and dust, which otherwise might contaminate the elemental sulphur obtained, the gases issuing from the contact chamber B are brought through the pipe 10, that is cooled by air or in some other way, in which pipe the temperature of the gases is reduced to a suitable degree, and from said pipe the gases are introduced into a Cottrell-apparatus C where said impurities are removed. In order to separate the sulphur formed, the purified gas thereafter is led through the pipe 10 to a condensation plant C consisting of a cooler and a Cottrell-apparatus where the gases are cooled to such a low temperature that the free sulphur may be separated out in a liquid or solid form and collected.

Having thus described my invention, I declare that what I claim is:—

A process of recovering sulphur, in conjunction with the melting of pyrites or pyritic material and involving the use of a shaft furnace, comprising introducing pyritic material in the shaft furnace together with an alkali metal compound, mixing the sulphur-containing gases obtained in melting the charge, with gaseous reducing agents, passing the mixture into a contact chamber filled with hot contact material coated with an alkali-metal compound, and maintaining the material hot by the combustion of the gases themselves.

AXEL RUDOLF LINDBLAD.